United States Patent
Maddux

(10) Patent No.: US 9,206,832 B1
(45) Date of Patent: Dec. 8, 2015

(54) CONNECTION NODE AND METHOD OF USE

(75) Inventor: Daniel Maddux, San Antonio, TX (US)

(73) Assignee: APA SERVICES, INC., Las Vegas, NV (US)

( * ) Notice: Subject to any disclaimer, the term of this patent is extended or adjusted under 35 U.S.C. 154(b) by 103 days.

(21) Appl. No.: 13/304,076

(22) Filed: Nov. 23, 2011

(51) Int. Cl.
*F16B 37/14* (2006.01)

(52) U.S. Cl.
CPC .................................. *F16B 37/14* (2013.01)

(58) Field of Classification Search
CPC ...... F16B 37/14; F16B 41/002; F16B 5/0208; F16B 35/06; F16B 37/0864; F16B 37/00; F16B 37/04; F16B 5/0283
USPC ......... 411/429, 432, 178, 374, 397, 433, 373, 411/103, 372.5, 372.6, 383, 384, 395, 396, 411/353, 517; 184/1.5
See application file for complete search history.

(56) References Cited

U.S. PATENT DOCUMENTS

| | | | | |
|---|---|---|---|---|
| 294,524 | A * | 3/1884 | Stiemke | 411/374 |
| 824,983 | A * | 7/1906 | Farrington | 411/403 |
| 1,194,792 | A * | 8/1916 | Stewart | 411/338 |
| 3,280,874 | A * | 10/1966 | Rosan | 411/178 |
| 3,365,162 | A | 1/1968 | Davis | |
| 3,387,621 | A * | 6/1968 | Schaff | 137/322 |
| 3,868,732 | A * | 3/1975 | Engelhart | 4/496 |
| 4,013,071 | A * | 3/1977 | Rosenberg | 606/306 |
| 4,025,048 | A * | 5/1977 | Tibbitts | 251/144 |
| 4,097,061 | A * | 6/1978 | Dietlein | 280/607 |
| 4,430,035 | A * | 2/1984 | Rodseth | 411/402 |
| 5,048,578 | A * | 9/1991 | Dorf et al. | 141/346 |
| 5,059,077 | A * | 10/1991 | Schmid | 411/400 |
| 5,358,367 | A * | 10/1994 | Yang | 411/397 |
| 5,444,897 | A | 8/1995 | Gross | |
| 5,964,767 | A * | 10/1999 | Tapia et al. | 606/323 |
| 5,971,684 | A | 10/1999 | Wang | |
| 6,308,476 | B1 * | 10/2001 | Nakamoto et al. | 52/217 |
| 6,361,258 | B1 * | 3/2002 | Heesch | 411/178 |
| 6,637,992 | B1 | 10/2003 | Chang | |
| 6,651,777 | B2 * | 11/2003 | Suratt | 184/1.5 |
| 6,764,259 | B1 | 7/2004 | Preta | |
| 6,974,290 | B2 * | 12/2005 | Pountney | 411/384 |
| 7,134,819 | B2 | 11/2006 | Bullock et al. | |
| 7,325,653 | B2 * | 2/2008 | Gunderson et al. | 184/103.1 |
| 7,651,305 | B1 | 1/2010 | Boyd et al. | |
| 2005/0047888 | A1 * | 3/2005 | Lyon | 411/178 |
| 2008/0110697 | A1 * | 5/2008 | Kim et al. | 184/1.5 |
| 2009/0057058 | A1 * | 3/2009 | Meyers | 184/1.5 |
| 2009/0241445 | A1 | 10/2009 | Sprague | |
| 2010/0247270 | A1 * | 9/2010 | Cao | 411/432 |

* cited by examiner

*Primary Examiner* — Roberta Delisle
(74) *Attorney, Agent, or Firm* — Greenberg Traurig, LLP

(57) ABSTRACT

A connection node comprising a base member and plug member. The plug member retracts into, and extends out of, the base member which can be installed in a floor, wall and/or ceiling. When the plug member is retracted, a cap may be used to conceal the base unit and plug member within the floor, wall and/or ceiling. The base member and plug member may be cylindrical whereby the plug member has a threaded exterior surface which mates with a threaded interior cavity of the base member. In such a configuration, the plug member may be removed from or inserted into said base member allowing a connection member (e.g., eye-hook) to be inserted. A series of connection nodes may be installed within the floor, walls and/or ceiling of a subject environment to create a system for connecting articles.

9 Claims, 6 Drawing Sheets

CONNECTION NODE AND METHOD OF USE

FIELD OF THE INVENTION

The embodiments of the present invention relate to connection nodes and methods of using the same.

BACKGROUND

Depending on the show type, trade show space accommodates many different types of articles (e.g., displays) in many different floor configurations. Many times the trade show items utilized by the trade show operators and participants require means for stabilizing and securing the same. Such stabilizing and securing minimizes risk and provides means for participants to best promote their wares at a subject trade show. Although there are many conventional connection mechanisms available for facilitating a trade show setup, they suffer from drawbacks.

Accordingly, there is a need for a new connection mechanism to assist with trade show setup. Advantageously, the connection mechanism should be versatile, concealable when not being used and suitable beyond trade show environments.

SUMMARY

The embodiments of the present invention relate to a connection node comprising a base member and plug member. In one embodiment, the plug member retracts into a cavity defined by the base member recessed in a floor, wall and/or ceiling. When the plug member is retracted, an attached cap is used to conceal the base unit and plug member within the floor, wall and/or ceiling. In one embodiment, the base member and plug member are cylindrical whereby the plug member has a threaded exterior surface which mates with a threaded interior defined cavity of the base member. In such a configuration, the plug member is easily removed from the base member when the connection node is ready for use and fully inserted when not in use. A system of connection nodes comprises a series of spaced connection nodes installed within the floor, walls and/or ceiling of a subject environment.

Using the connection node comprises: (i) removing the plug member to expose the cavity defined by the recessed base member; (ii) inserting a connection member (e.g., eye-hook); and (iii) connecting a desired article to the connection member. In another embodiment, the cavity defined by the base member receives a threaded member associated with a physical article to be secured (e.g., pole).

In one embodiment, a system of connection nodes is used within a trade show environment and used to help configure trade show items for the trade show operator and participants. However, those skilled in the art will recognize that the connection nodes may be used in any environment requiring connection means.

Other variations, embodiments and features of the present invention will become evident from the following detailed description, drawings and claims.

DETAILED DESCRIPTION

Figure 1:
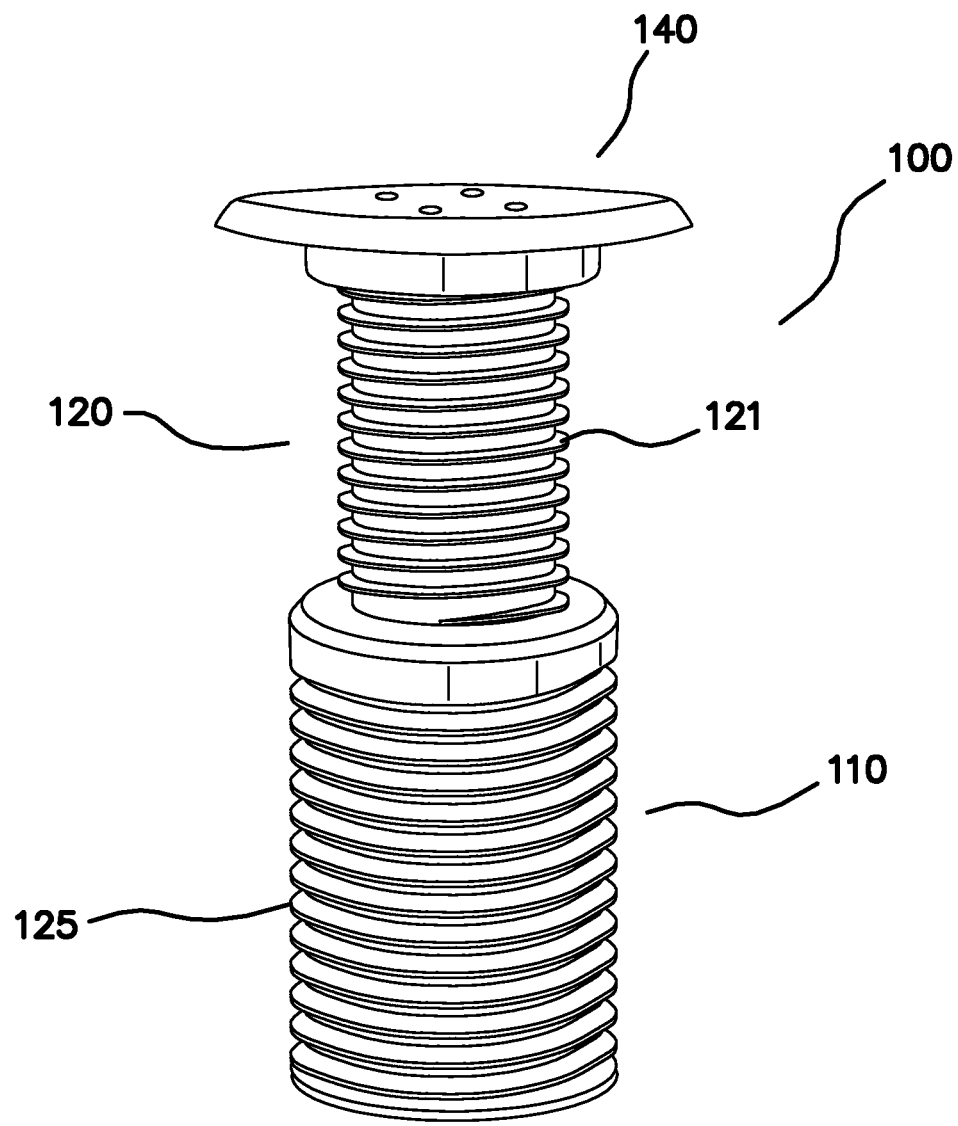
FIG. 1 illustrates a perspective view of a connection node according to the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

The embodiments of the present invention involve a connection node system, connection node and method of using the same. The connection nodes may be manufactured out of suitable materials including metals, alloys, composites, plastics and combinations thereof. The components of the connection nodes may be created using technologies which include machining, molding, rapid prototyping, casting, etc.

Figure 2:
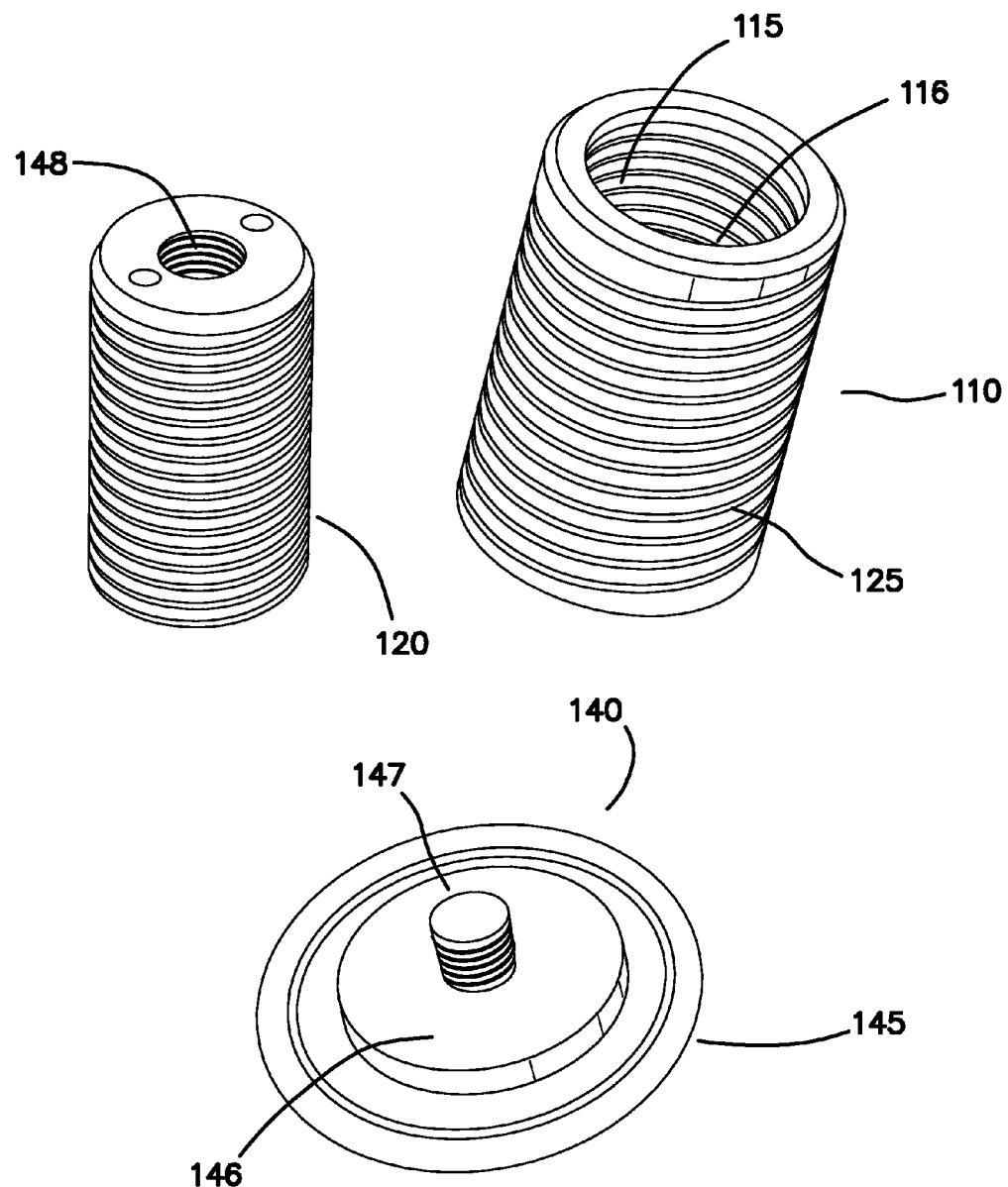
FIG. 2 illustrates a perspective view of the individual members of the connection node according to the embodiments of the present invention.
Figure 3:
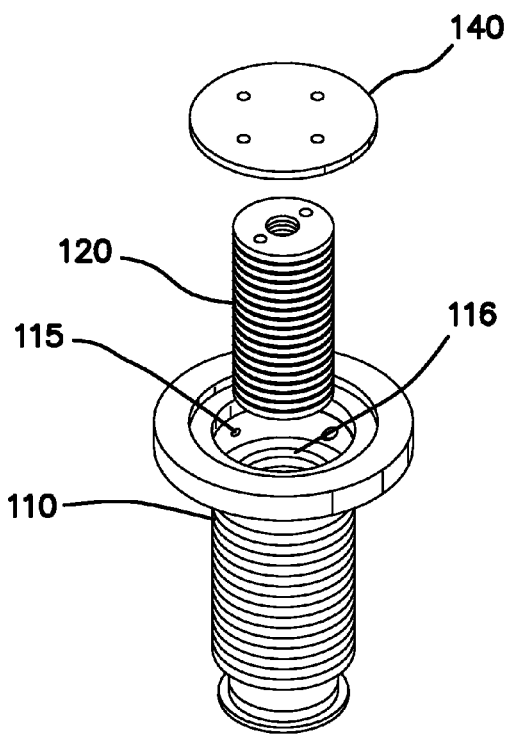
FIG. 3 illustrates a perspective exploded view of a connection node according to the embodiments of the present invention.

FIGS. 1-3 show a connection node 100 according to the embodiments of the present invention. The connection node 100 includes a base member 110 and plug member 120. The plug member 120, as shown, fits within a cavity 115 defined by the base member 110. As shown, the plug member 120 has a threaded exterior surface 121. A single thread traverses the exterior surface 121 of the plug member 120. An interior surface 116 of the base member cavity 115 is similarly threaded and configured to receive the threaded plug member 120. A single thread traverses the interior surface 116 of the base member 110. As configured, the plug member 120 may be fully retracted within the base member 110 (see FIG. 4) when the connection node 100 is not being used and removed during use as described below. It is understood that either the exterior surface 121 of the plug member 120 and/or the interior surface 116 of the base member 110 may be partially threaded rather than fully threaded as long as the plug member 120 may be fully retracted within the base member 110.

An exterior surface 125 of the base member 110 is also threaded with a single thread. The single thread is configured to mate with a single thread around a housing or collar 130 installed into a floor, wall and/or ceiling whereby said housing or collar 130 defines a cavity configured to receive the base member 110. The cavity may comprise a hole in a floor, wall and/or ceiling dimensioned to receive a threaded cylinder dimensioned to receive said base member 110. The housing 130 may be secured into the hole using friction, adhesive or mechanical connectors. The housing 130 may be built into the floor (e.g., installed during the pouring of a concrete floor), wall and/or ceiling or may be installed after the fact (e.g., drilling or boring a hole in a concrete floor). In other embodiments, the base member 110 may be secured to the housing 130 by other suitable means such as friction, adhesives and mechanical connectors. The base member 110 may also be integrated directly into a floor, ceiling and/or wall without the housing 130. A top cap 140 mates with the base member 110 as described below.

Figure 4:
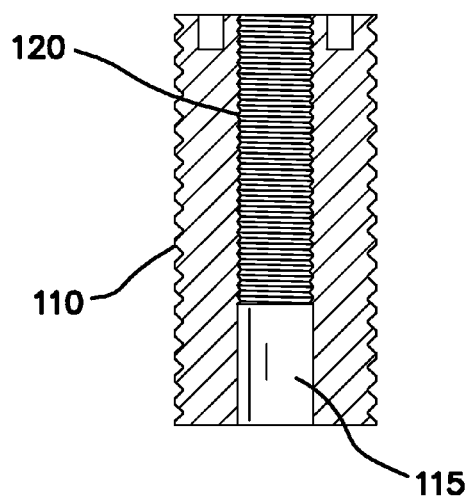
FIG. 4 illustrates a cross-sectional side view of a connection node according to the embodiments of the present invention.
Figure 5:
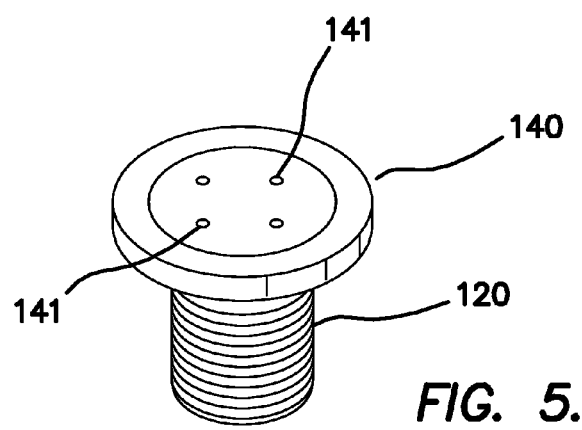
FIG. 5 illustrates a top cap associated with the connection node according to the embodiments of the present invention.

Now referring to FIG. 4, a cross-sectional view of the connection node 100 with the plug member 120 fully retracted within the base member 110. As shown, the plug member 120 is threaded into the base member 110. FIG. 5 shows the top cap 140 configured for attachment to said plug member 120. The top cap 140 comprises a plate 145. A top surface of the plate 145 acts to conceal the connection node 100 when not is use. The top cap 140 also provides a flush surface when the connection node 100 is not in use. For example, when installed in a floor, the top cap 140 conceals the connection node 100 therebelow and provides a surface flush with the floor to prevent any accidents to persons walking on said floor. In one embodiment, a bottom surface 146 of the top cap 140 includes a threaded projection 147 dimensioned to be received by a threaded cavity 148 in said plug member 120. Other means of connection between the top cap 140 and plug member 120 may be used as well. The top cap 140 and plug member 120 may also be fabricated as a single integral unit.

Figure 6:
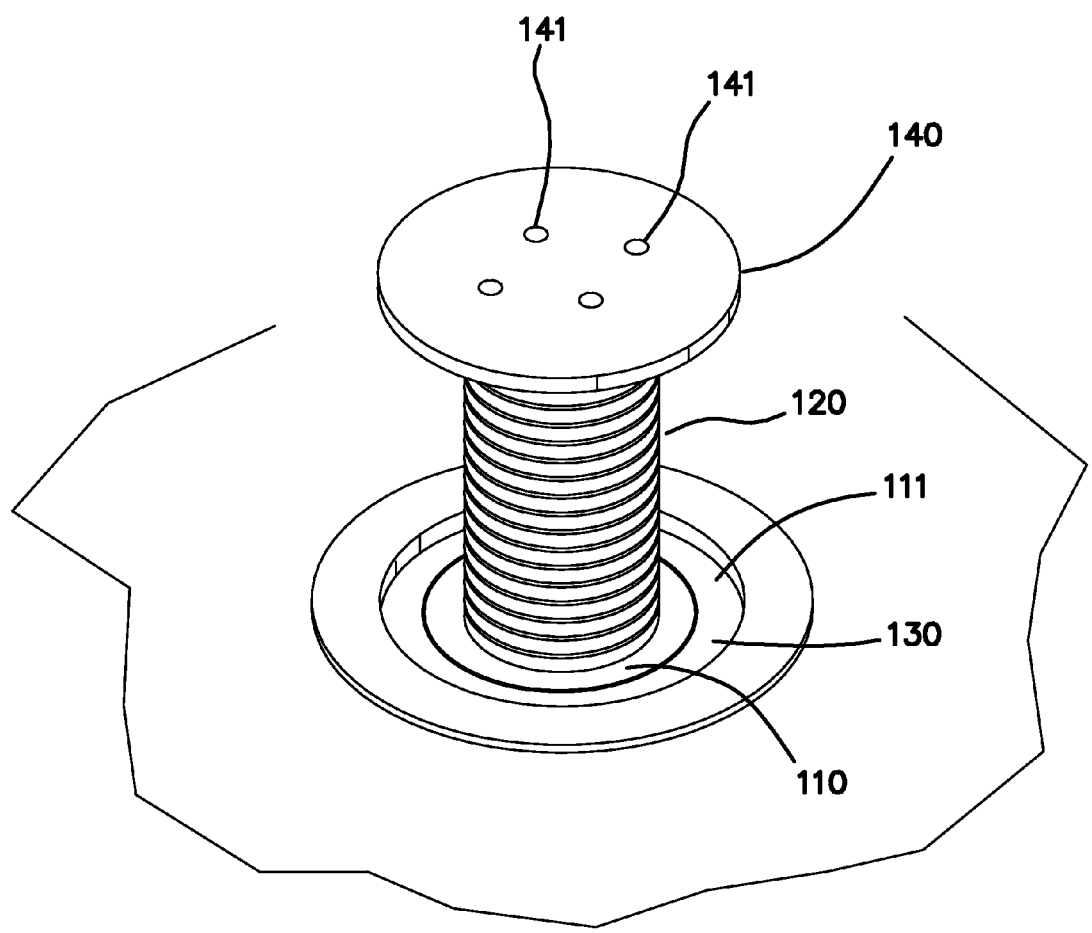
FIG. 6 illustrates a connection node installed in a floor of a subject environment according to the embodiments of the present invention.
Figure 7:
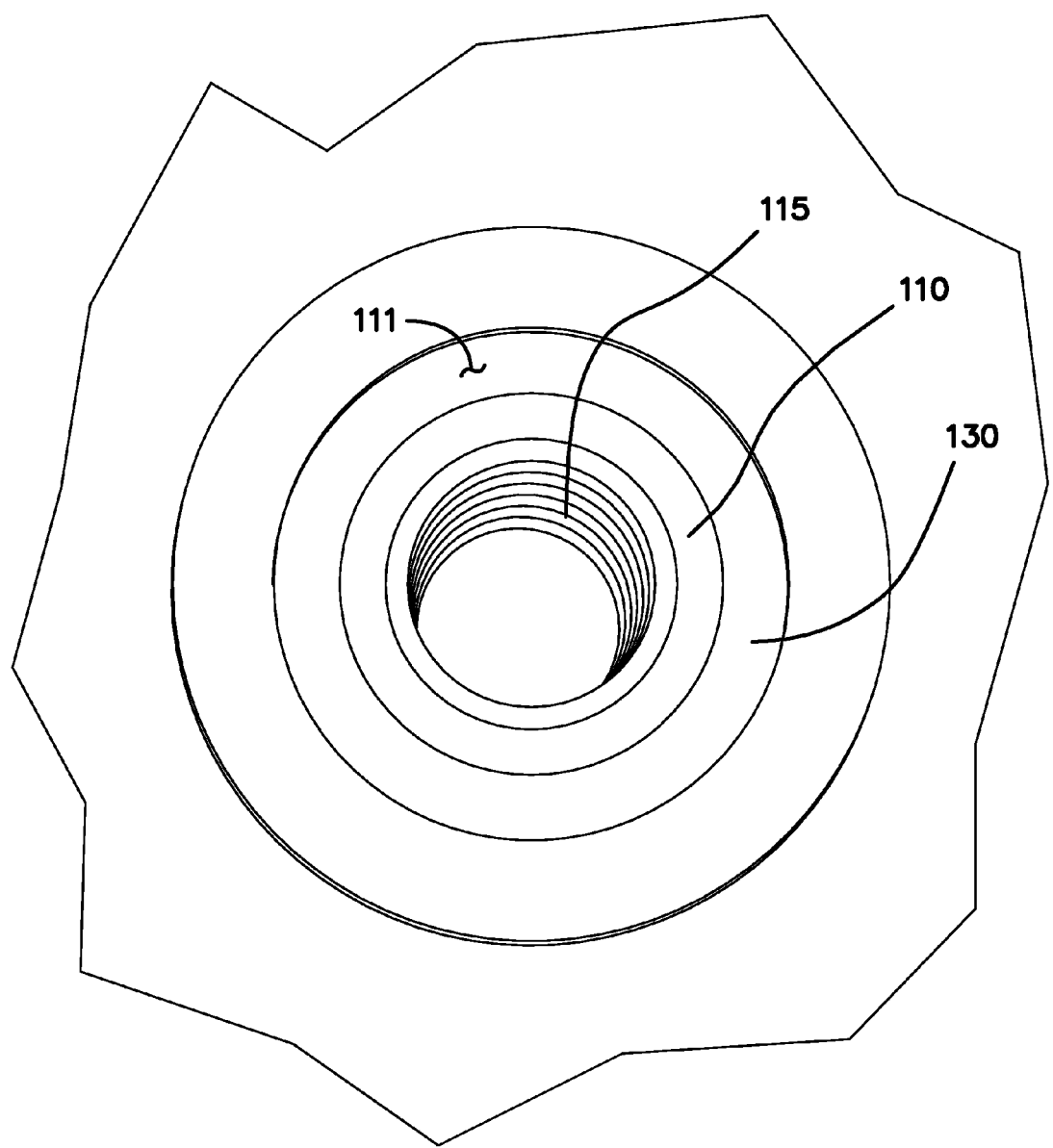
FIG. 7 illustrates a top view of a base member installed in a floor according to the embodiments of the present invention.

FIG. 6 shows the base member 110 installed in a floor. When installed, an upper portion of the base member 110 is circumscribed with a recessed section 111 allowing the top cap 140 to set therein maintaining the top cap 140 in a flush relationship with the floor, ceiling and/or wall in which the base member is installed. FIG. 7 shows a top view of a base member 110 installed in a floor with the plug member 120 removed showing the defined cavity 115.

Figure 8:
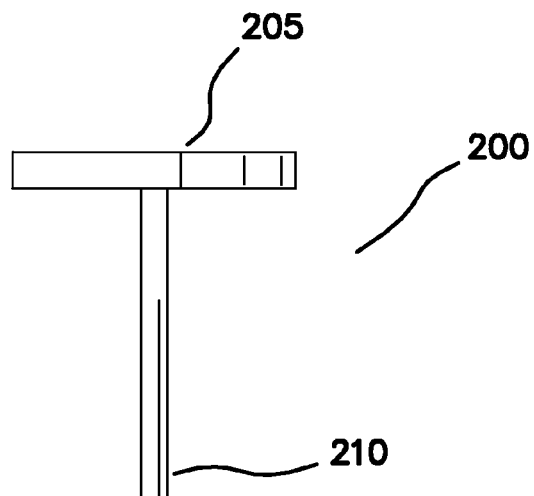
FIG. 8 illustrates a tool of the type suitable to remove a plug member of the connection node according to the embodiments of the present invention.

To use the connection node 100, the plug member 110 must be removed from the base member 120. In one embodiment, the removal is facilitated by a tool 200 of the type shown in FIG. 8. The tool 200 comprises a handle 205, elongated rod 210 and head 215 having a series of protrusions 220 (four in this instance). The four protrusions 220 are positioned on the head 215 in a pattern matching a pattern of cavities 141 in the top cap 140. Removing the top cap 140 comprises inserting the four protrusions 220 into the pattern of cavities 141 and turning the top cap 140 such that the connected plug member 120 is unscrewed from the cavity 115 defined by the base member 110 thereby exposing the cavity 115.

Figure 9:
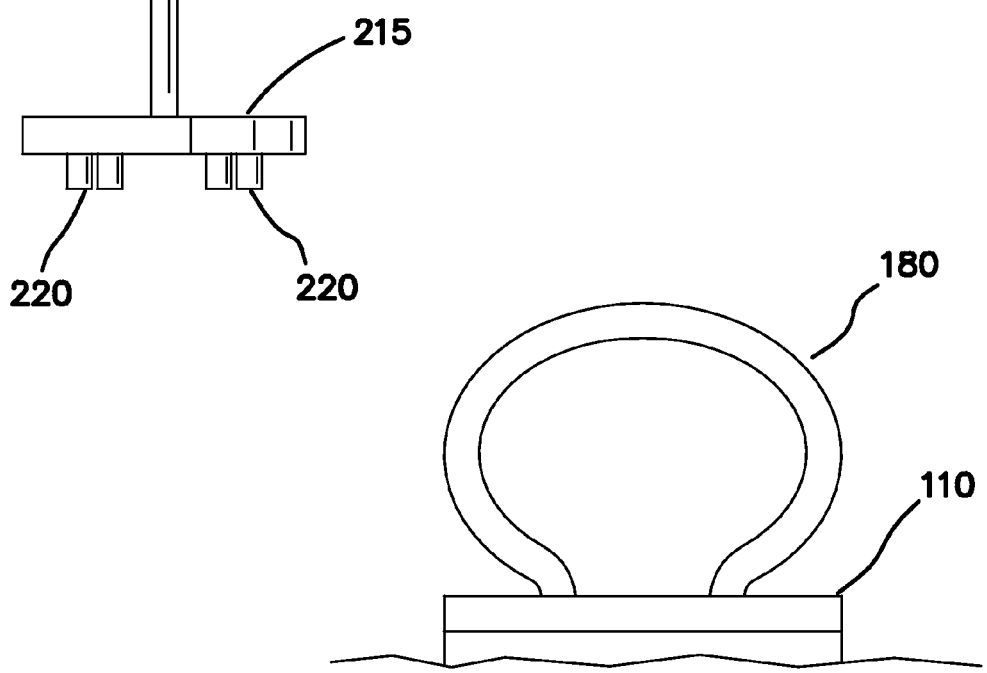
FIG. 9 illustrates an eye-hook inserted into a connection node according to the embodiments of the present invention.

Once the plug member 120 is removed, a connection member 180 is inserted into the base member 110. For example, a threaded eye-hook 180 (see FIG. 9) can be threadedly inserted into the cavity 115 defined by the base member 110. The eye-hook 180 provides a mechanism for attaching wires, cables, cords and the like. The cavity of the base member 110 may also receive threaded members associated with physical articles for attachment directly thereto. For example, a series of threaded poles may be inserted into a series of installed base members 110 allowing a curtain or other divider to be used to separate a room. A piece of furniture having one or more threaded legs may be secured using one or more connection nodes.

Although the invention has been described in detail with reference to several embodiments, additional variations and modifications exist within the scope and spirit of the invention as described and defined in the following claims.

I claim:

1. A connection node comprising:
   a base member defining a cavity, said cavity at least partially threaded, said base member having a collar defining a first upper recess and second lower recess proximate said cavity, said base member configured to be retained within a floor, wall or ceiling with an upper surface of said collar being substantially flush with a surface of said floor, wall or ceiling when installed, said first upper recess having a greater diameter than said second lower recess;
   a plug member having an outer surface, said outer surface at least partially threaded;
   a top cap removably connectable to said plug member, said top cap formed of a circular plate-like upper portion having a first diameter and a circular member extending from a bottom of said circular plate-like upper portion having a second diameter smaller than said first diameter; and
   wherein said plug member is dimensioned to be received by said cavity of said base member in a threaded relationship, said cavity dimensioned to allow said plug member to be fully refracted therein or extended therefrom such that when said plug member is fully retracted, said circular plate-like upper portion resides within said first upper recess and said circular member resides within said second lower recess such that an upper surface of said top cap is substantially flush with said upper surface of said collar and a surface of said floor, wall or ceiling when said base member is retained therein thereby concealing said base member and plug member when said connection node is not in use.

2. The connection node of claim 1 wherein an outer surface of said base member is threaded.

3. The connection node of claim 1 wherein said top cap comprises a flat plate.

4. The connection node of claim 1 wherein said base member and plug member have a circular cross-section.

5. A connection node comprising:
   a base member defining a central cavity having a threaded surface, said base member having a collar defining a first upper recess and second lower recess proximate said cavity, said base member configured to be retained within a floor, wall or ceiling with an upper surface of said collar being substantially flush with a surface of said floor, wall or ceiling when installed, said first upper recess having a greater diameter than said second lower recess;
   a plug member having a threaded outer surface configured to mate with said threaded surface of said cavity permitting said plug member to move relative to said base member; and
   a top cap removably connectable to said plug member, said top cap formed of a circular plate-like upper portion having a first diameter and a circular member extending from a bottom of said circular plate-like upper portion having a second diameter smaller than said first diameter such that when said plug member is fully refracted in said base member, said circular plate-like upper portion resides within said first upper recess and said circular member resides within said second lower recess such that an upper surface of said top cap is substantially flush with said upper surface of said collar and a surface of said floor, wall or ceiling when said base member is retained therein thereby concealing said base member and plug member when said connection node is not in use.

6. The connection node of claim 5 wherein an outer surface of said base member is threaded.

7. The connection node of claim 5 wherein said top cap comprises a flat plate.

8. The connection node of claim 5 wherein said base member and plug member have a circular cross-section.

9. A connection node comprising:
- a base member defining a cavity, said cavity at least partially threaded, said base member having a collar defining a first upper recess and second lower recess proximate said cavity, said base member configured to be retained within a floor, wall or ceiling with an upper surface of said collar being substantially flush with a surface of said floor, wall or ceiling when installed, said first upper recess having a greater diameter than said second lower recess;
- a plug member having an outer surface, said outer surface at least partially threaded; wherein said plug member is dimensioned to be received by said cavity in a threaded relationship, said cavity is dimensioned to allow said plug member to be fully refracted therein or extended therefrom; and
- a top cap formed of a circular plate-like upper portion having a first diameter and a circular member extending from a bottom of said circular plate-like upper portion having a second diameter smaller than said first diameter wherein said circular plate-like upper portion resides within said first upper recess and said circular member resides within said second lower recess such that an upper surface of said top cap is substantially flush with said upper surface of said collar and a surface of said floor, wall or ceiling when said base member is retained therein thereby concealing said base member and plug member when said connection node is not in use.

* * * * *